Feb. 3, 1942.      H. H. BEVERAGE      2,271,909
ULTRA SHORT WAVE NOISE ELIMINATOR
Filed Dec. 14, 1939

INVENTOR.
HAROLD H. BEVERAGE
BY
ATTORNEY.

Patented Feb. 3, 1942

2,271,909

UNITED STATES PATENT OFFICE 2,271,909

ULTRA SHORT WAVE NOISE ELIMINATOR

Harold H. Beverage, Riverhead, N. Y., assignor to Radio Corporation of America, a Delaware corporation Application December 14, 1939, Serial No. 309,131

10 Claims. (Cl. 250—20)

This invention relates to a new and novel ultra-short wave noise eliminator.

An object of this invention is to provide an improved noise elimination system and it is especially adapted for the elimination of local man-made noises, such as is caused by automobile ignition, etc.

A feature of this invention is the novel arrangement of an antenna located at a considerable height above the ground and a similar antenna located near the surface of the ground. A plurality of transmission lines are coupled between the antennae and a receiver in a manner such as to cancel out the noise energy before it reaches the receiver.

Directive antennae have been used for many years for eliminating interference, static, and man-made noises. In most cases, the discrimination effective against these distrubances has been obtained by directivity in the horizontal plane. In some cases where short waves are used, directivity in the vertical plane has also been used effectively. Elimination of noise produced at ground level is inherent to some extent in antennae designed to receive horizontal polarization because of the cancellation between the direct ray and the ray reflected from the ground. If the noise source is near the ground, the path difference between the direct and reflected rays is practically zero and the reflected ray is 180 degrees out of phase with the direct ray. The theory of this cancellation at low angles has been discussed in published technical papers, for example, see Trevor and Carter, "Notes on Propagation of Waves Below Ten Meters in Length," Proc. of I. R. E. vol. 21, #3, March, 1933.

My invention differs from the prior art in that I make use of the difference in the vertical potential gradient above the earth that exists between a distant signal and a local source of noise, originating in most cases near the surface of the earth, such as, for example, automobile ignition.

The operation of this invention will best be understood by referring to the accompanying drawing, in which.

Figure 1:
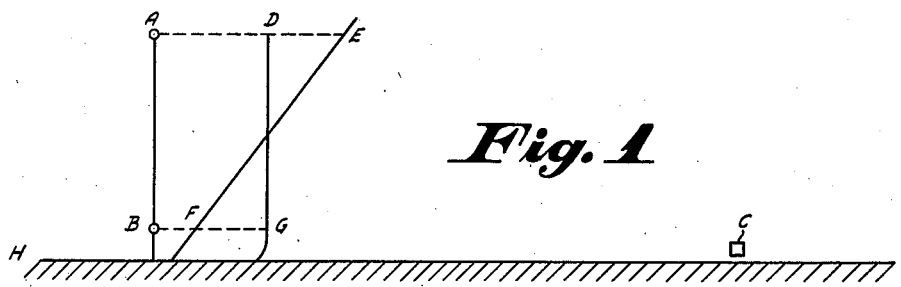
Fig. 1 illustrates the principle upon which my invention is based.

Referring to Fig. 1, it has been found that the intensity of ultra-short wave signals generally increases approximately linearly with the height of the receiving antenna, as shown by the line FE, that is, if the antenna is at the position shown as B, the signal intensity will be proportional to BF. On the other hand, if the antenna is in the position shown as A, the signal intensity will be proportional to AE. I have found, however, that a source of noise located at some point near the antenna, such as C, produces a field which does not increase materially with increased height of the receiving antenna. The line DG illustrates the variation of noise received from C with height of the antenna.

From Fig. 1, it will be noted that the signal to noise ratio on antenna A will be AE/AD and for antenna B, it will be BF/BG. Since the noise on antennae A and B as represented by AD and BG, respectively, are equal or substantially equal, it is obvious that if the outputs of antennae A and B are adjusted for equality and the phase is adjusted for cancellation of the noise, there should be little effect on the signal since the signal that would be remaining would be the difference between AE and BF, even if the phase relations were such that BF were 180 degrees opposite from AE, which is not necessarily the case.

Figure 2:
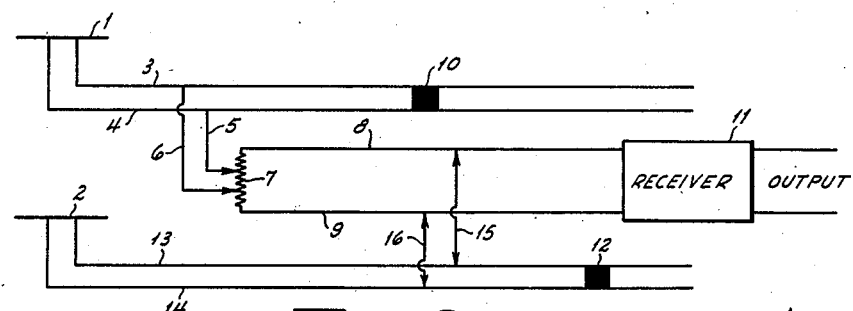
Fig. 2 shows a circuit diagram of one method of my invention.

Fig. 2 shows one way which can be used to carry out the principles mentioned above. In Fig. 2, 1 is an antenna located at a considerable height above the ground, 2 is a similar antenna located near the ground. Antenna 1 is connected through transmission line 3—4 and, similarly, 2 is connected through transmission line 13—14. The third transmission line is attached to receiver 11 and may be damped by resistor or potentiometer 7 to substantially eliminate reflections in the lines 8 and 9. The transmission lines 8 and 9 are connected with antenna 2 through jumpers 15 and 16 and also with antenna 1 through jumpers 5 and 6. The position of jumpers 15 and 16 is adjusted such that the noise voltages received on antenna 2 are introduced into transmission lines 8 and 9 with a phase relation 180 degrees opposite to the noise voltages at this point received from antenna 1. The phase relations may be adjusted by moving jumpers 15 and 16 back and forth and it is obvious that the phase relations can be reversed 180 degrees by interchanging the position of jumpers 15 and 16, that is, jumper 15 is shown connecting wires 8 and 13 while jumper 16 is shown connecting wires 9 and 14. If the jumpers are reversed so jumper 16 connects wires 8 and 14 and jumper 15 connects wires 9 and 13, the phase of the currents from antenna 2 would be reversed 180 degrees at the point where the energy is introduced into transmission lines 8 and 9.

There has been provided short-circuiting bars 10 and 12 for adjusting the impedances of transmission lines 3—4 and 13—14, respectively, so that they will be substantially matched to the impedance of transmission lines 8—9.

I have also shown potentiometer 7 with two sliders connected to jumpers 5 and 6 for adjusting the intensity of the noise energy from antenna 1 to equality with the corresponding noise energy from antenna 2.

Figure 3:
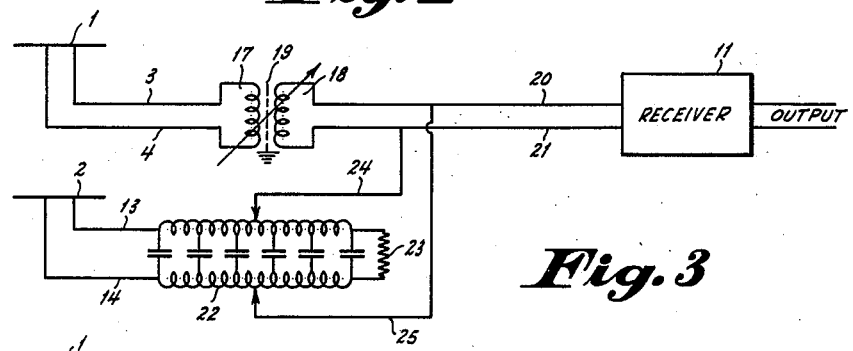
Fig. 3 is a circuit diagram of a modification of Fig. 2.

In Fig. 3, I have shown a modification which is more compact and more convenient to use but which is based on the same principles as the arrangements shown in Fig. 2. In Fig. 3, I have shown a coupling arrangement with primary 17 and secondary 18 between antenna 1 and receiver 11 for adjusting the intensity of the energy received on antenna 1. The phase of the energy from antenna 2 is adjusted by moving sliders 24 and 25 on artificial line 22. A resistance 23 is connected at one end of the artificial line. This resistance is made equal to the surge impedance of the artificial line so as to prevent reflections from the end of the line, thereby obtaining a substantially constant voltage along the entire length of the line. As artificial lines are old in the art, it is not believed necessary for them to be further described here.

In operation, the phase of the noise energy from antenna 2 is adjusted with artificial line 22 and the intensity of the energy from antenna 1 is adjusted by adjusting the coupling between 17 and 18. An electrostatic shield 19 may be placed between 17 and 18, if desired. It is obvious that, with the correct adjustments of phase and intensity, the noise voltages from antennae 1 and 2 will oppose but the signal will not cancel because of its very much lower intensity in antenna 2 as compared with antenna 1.

Figure 4:
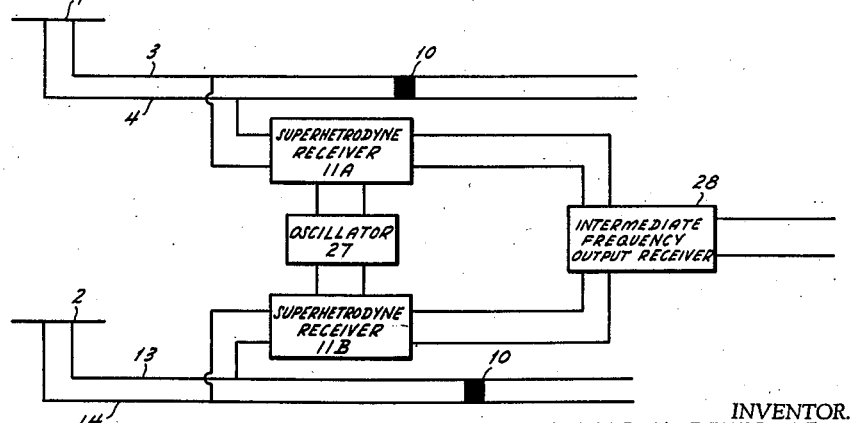
Fig. 4 is a circuit diagram of a still further modification of Fig. 2, wherein a separate receiver is connected to each antenna.

While I have shown phase and intensity adjustments as being made at the ultra-high frequency, I do not wish to limit myself to this arrangement. For example, as shown by Fig. 4, separate receivers 11A and 11B, of the superheterodyne type, are shown connected to each transmission line, as in many cases it will be desirable to beat the energies from antennae 1 and 2 with a common high frequency oscillator 27 to obtain a lower intermediate frequency. The two separate receiver outputs are combined at the intermediate frequency output receiver 28. It is particularly desirable to be able to use an artificial line, including a plurality of inductances and condensers, such as 22, designed for an intermediate frequency rather than an ultra-short wave frequency, since artificial lines for an intermediate frequency are already developed and known to the art.

The artificial line, not shown, may be inserted between either of receivers 11A or 11B and receiver 28. The intensity of the noise voltages from receivers 11A and 11B may be equalized by varying the gain of one or both receivers by any one of several methods known to the art, such as varying the coupling, varying the grid bias of an amplifying tube, etc.

Other modifications will be apparent to those skilled in the art, therefore, this invention should not be limited to the precise system shown.

What is claimed is:

1. A short wave noise eliminator having in combination a first antenna, a second antenna, a first transmission line coupled to said first antenna and a second transmission line coupled to said second antenna, a third transmission line and a receiver coupled thereto, said first antenna located above the surface of the ground, said second antenna located near the surface of the ground, and means for so linking said first and second transmission lines to said third transmission line that the relative line lengths from said receiver to each of said antennae may be varied.

2. A short wave noise eliminator comprising a first antenna located above the ground, a second antenna located beneath said first antenna at a point near the ground, a first transmission line coupled to said first antenna and a second transmission line coupled to said second antenna, a third transmission line and a receiver coupled thereto, and means for so linking said first and second transmission lines to said third transmission line that the relative line lengths from said receiver to each of said antennae may be varied.

3. A short wave noise eliminator comprising a first antenna located above the ground, a second antenna located beneath said first antenna, a first transmission line coupled to said first antenna, a second transmission line coupled to said second antenna, a third transmission line linked to said first and second antennae, means for adjusting the impedances of said first and second transmission lines, a potentiometer connected to said third transmission line having variable arms linked to said first transmission line, and a receiver coupled to said third transmission line.

4. A short wave noise eliminator comprising a first antenna located above the ground, a second antenna located beneath said first antenna at a point near the ground, a first transmission line coupled to said first antenna and a second transmission line coupled to said second antenna, a third transmission line, a coupling transformer linked between said first and third transmission lines, a receiver coupled to said third transmission line, and means for so coupling said second transmission line to said third transmission line that the effective length of said second transmission line may be varied.

5. A short wave noise eliminator comprising a first antenna located above the ground, a second antenna located beneath said first antenna at a point near the ground, a first transmission line coupled to said first antenna and a second transmission line coupled to said second antenna, a third transmission line, a coupling transformer having an electrostatic shield linked between said first and third transmission lines, a receiver coupled to said third transmission line and means for so coupling said second transmission line to said third transmission line that the effective length of said second transmission line may be varied.

6. A short wave noise eliminator comprising a first antenna located above the ground, a second antenna located beneath said first antenna at a point near the ground, a first transmission line coupled to said first antenna, a second transmission line coupled to said second antenna, a third transmission line, a coupling transformer connected between said first and third transmission lines, an artificial line connected between said second transmission line and said third transmission line, the effective length of said artificial line being variable and a receiver connected to said third transmission line.

7. An ultra-short wave noise eliminator having in combination a first antenna located above the ground, a second antenna located beneath the said first antenna at a point near the surface of the ground, transmission lines connecting each of said antennae to a separate receiving means of the superheterodyne type, a high frequency oscillator common to both receiving means for producing the same intermediate frequency in each receiver, means for combining the intermediate frequencies from the two receivers in such manner as to cause the noise voltages from the two antennae to oppose.

8. A short wave noise eliminator comprising a first antenna located above the ground, a second antenna located beneath said first antenna at a point near the ground, a first transmission line coupled to said first antenna and a second transmission line coupled to said second antenna, a third transmission line, a coupling transformer connected between said first and third transmission lines, an artificial line connected between said second transmission line and said third transmission line means for adjusting said artificial line, and a receiver connected to said third transmission line.

9. A short wave noise eliminator comprising a first antenna located above the ground, a second antenna located beneath said first antenna at a point near the ground, a first transmission line coupled to said first antenna and a second transmission line coupled to said second antenna, a third transmission line, a variable coupling transformer connected between said first and third transmission lines, an artificial line connected between said second transmission line and said third transmission line, a receiver connected to said third transmission line, and means for adjusting the phase length of said artificial line.

10. An ultra-short wave noise eliminator having in combination a first antenna located above the ground, a second antenna located beneath said first antenna at a point near the surface of the ground, a first transmission line connected to said first antenna, a second transmission line connected to said second antenna, a potentiometer having two variable contacts connected to said first transmission line, a third transmission line, said third transmission line being parallel to a portion of said second transmission line and connected thereto by sliders shiftable along the length of said parallel portion, said third transmission line also being connected to the ends of said potentiometer, and a receiver connected to said third transmission line.

HAROLD H. BEVERAGE.